United States Patent [19]
Tagawa

[11] Patent Number: 5,530,818
[45] Date of Patent: Jun. 25, 1996

[54] SEMICONDUCTOR INTEGRATED CIRCUIT DEVICE FOR OPTIONALLY SELECTING THE CORRESPONDENCE BETWEEN A CHIP-SELECT SIGNAL AND ADDRESS SPACE

[75] Inventor: Koutarou Tagawa, Kawasaki, Japan

[73] Assignee: Fujitsu Limited, Kawasaki, Japan

[21] Appl. No.: 87,460

[22] Filed: Jul. 8, 1993

[30] Foreign Application Priority Data

Jul. 9, 1992 [JP] Japan .................................. 4-182512

[51] Int. Cl.⁶ .................................................. G06F 12/06
[52] U.S. Cl. ..................... 395/401; 395/410; 365/230.01
[58] Field of Search ..................................... 395/162–166, 395/400, 425, 823, 829, 401, 402, 497.01, 410, 421.04; 345/200, 203; 365/230.01, 230.03, 230.05, 230.06, 230.08

[56] References Cited

U.S. PATENT DOCUMENTS

4,707,802 11/1987 Takahashi ............................... 395/275

*Primary Examiner*—Kee Mei Tung
*Attorney, Agent, or Firm*—Armstrong, Westerman, Hattori, McLeland & Naughton

[57] ABSTRACT

A semiconductor integrated circuit device has a first unit for generating an address and supplying the address to an external device, a plurality of registers for storing predetermined data which designate an address space, a plurality of comparators, and a second unit. Each of the comparators is used to compare the address output from the first unit and the predetermined data stored in each of the registers. The second unit is used to merge a plurality of outputs of the comparators and to generate an enable signal to activate the external device, when at least one of the outputs of the comparators indicates coincidence between the address and the predetermined data. The semiconductor integrated circuit device makes it possible to activate the external device when at least one of the outputs of the comparators indicates coincidence between the address and the predetermined data.

12 Claims, 13 Drawing Sheets

PRIOR ART

SEMICONDUCTOR INTEGRATED CIRCUIT DEVICE FOR OPTIONALLY SELECTING THE CORRESPONDENCE BETWEEN A CHIP-SELECT SIGNAL AND ADDRESS SPACE

BACKGROUND OF THE INVENTION

1. Field of the Invention

The present invention relates to a semiconductor integrated circuit device for optionally selecting the correspondence between a chip-select signal and address space.

2. Description of the Related Art

Recently, it has been desired to decrease the size, power consumption, and price of an entire computer system as computer-storage products are downsized. Therefore, it is desirable to decrease the number in chips in the entire computer system.

A semiconductor integrated circuit device (chip-select address decoder) according to the prior art comprises address decoder sections corresponding to a plurality of memory chips and each address decoder section has a register, a comparator circuit, a selection gate, and a control circuit. The comparator circuit compares predetermined addresses from among all addresses supplied from a CPU with addresses previously set in the register and outputs a chip-select signal when the addresses coincide.

An initial region for storing an initial program (initial routine) is assigned to a memory chip and, for example, a user region for storing a user program (application program) is assigned to the same memory chip. For a semiconductor integrated circuit device according to the prior art, it is impossible to assign two or more separate address spaces to one memory chip. Therefore, when an address requiring the initial routine for resetting the CPU is separate from an address of the user program, the addresses cannot be stored in one memory chip.

SUMMARY OF THE INVENTION

An object of the present invention is to provide a semiconductor integrated circuit device for constituting a system with the minimum number of chips by selectively allowing one chip to be observed through a plurality of address spaces.

According to the present invention there is provided a semiconductor integrated circuit device comprising a first unit for generating an address and supplying the address to an external device, a plurality of registers for storing predetermined data which designate an address space, a plurality of comparators for comparing the address output from the first unit and the predetermined data stored in each of the comparators, and a second unit for merging a plurality of outputs of the comparators and for generating an enable signal to activate the external device, when at least one of the outputs of the comparators indicates coincidence between the address and the predetermined data.

The second unit may selectively merge the outputs of the comparators in accordance with a first control data. The second unit may selectively merge some of the outputs of the comparators in accordance with the first control data. The second unit may select one of the outputs of the comparators in accordance with the first control data.

The semiconductor integrated circuit device may further comprise a central processing unit, an address bus for transferring the address, and a data bus; and the predetermined data and the first control data may be supplied by the central processing unit through the data bus. The predetermined data and the first control data may be changed by the central processing unit.

The semiconductor integrated circuit device may further comprise a multiplexer, connected between at least one of the comparators and the registers, for selectively supplying the predetermined data output from one of the registers in accordance with a second control data. The semiconductor integrated circuit device may further comprises a plurality of first terminals for outputting the outputs of the comparators respectively, and a second terminal for outputting the enable signal.

The second unit may selectively enable to output the outputs of the comparators to the first terminals in accordance with a first control data. The external device may comprise a plurality of memory chips. The semiconductor integrated circuit device may be used for a printer, and the memory chips may store character data of different fonts. The semiconductor integrated circuit device may further comprise at least one fixed data setting unit, operatively connected in parallel with the registers, for previously setting a fixed data which designate a specific address space.

BRIEF DESCRIPTION OF THE DRAWINGS

The present invention will be more clearly understood from the description of the preferred embodiments as set forth below with reference to the accompanying drawings, wherein:

FIG. 7, consisting of FIGS. 7A and 7B, is a block diagram showing an example of overall configuration of a one-chip microcomputer having a semiconductor integrated circuit device according to the present invention;

DESCRIPTION OF THE PREFERRED EMBODIMENTS

For a better understanding of the preferred embodiments, the problems of the prior art will be explained, with reference to FIGS. 1 and 2.

Figure 1:
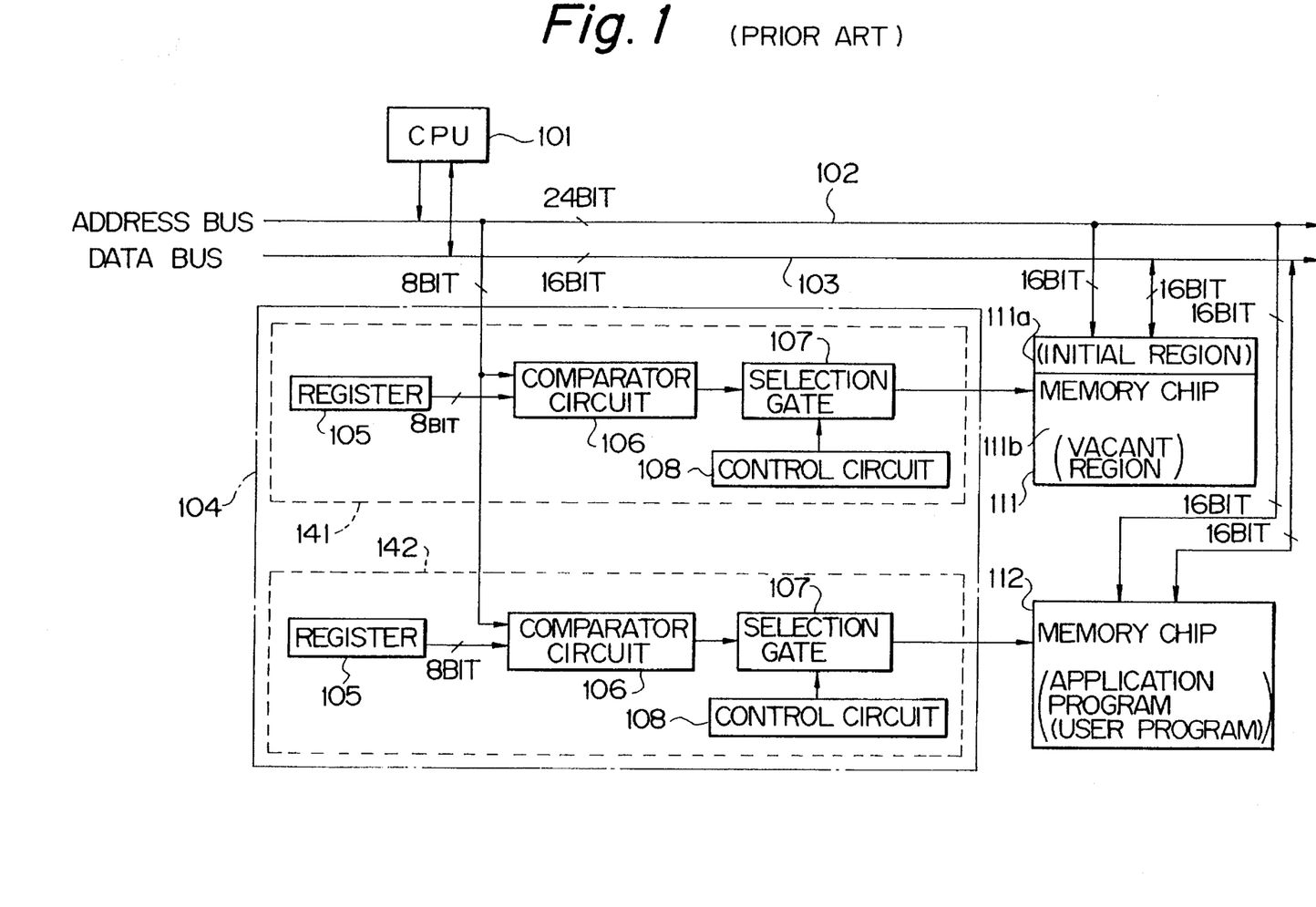
FIG. 1 is a block diagram showing an example of a semiconductor integrated circuit device according to the prior art.

FIG. 1 shows an example of a semiconductor integrated circuit device according to the prior art.

In FIG. 1, symbol 101 shows a CPU, 102 is an address bus, 103 shows a data bus, 104 shows a semiconductor integrated circuit device (chip-select address recorder), and 111 and 112 show memory chips. Symbol 105 shows a register, 106 shows a comparator circuit, 107 shows a selection gate (selector circuit), and 108 shows a control circuit.

As shown in FIG. 1, the semiconductor integrated circuit device comprises address decoder sections 141 and 142 corresponding to the memory chips 111 and 112 and each of the address decoder sections 141 and 142 has a register 105, a comparator circuit 106, a selection gate 107, and a control circuit 108.

The comparator circuit 106 compares predetermined addresses (e.g. high-order 8 bits) among all addresses (e.g. 24 bits) supplied from the CPU 1 with the addresses (8 bits) previously set into the register 105 and outputs a chip-select signal to the memory chips 111 and 112 through the selection gate 107 controlled by the control circuit 108 when the addresses coincide. In this case, the low-order 16 bits of the addresses of 24 bits are directly supplied to the memory chips 111 and 112 respectively.

An initial region 111a for storing an initial program (initial routine) is assigned to the memory chip 111 and also, a user region for storing a user program (application program) is assigned to the memory chip 112.

For the above-mentioned semiconductor integrated circuit device according to the prior art shown in FIG. 1, two or more separate address spaces cannot be assigned to one memory chip. Therefore, when an address space for an initial routine for resetting the CPU 1 is separate from an address space for a user program, both address spaces cannot be stored in one memory chip.

As shown in FIG. 1, the initial region 111a occupied by an initial program uses only a part of the capacity of the memory chip 111 and the memory chip 111 cannot be assigned to a plurality of spaces. Therefore, it is the present situation that the region 111b other than the region for the initial program in the memory chip 111 is not used.

Moreover, because the semiconductor integrated circuit device according to the prior art cannot change assigned addresses after running a program, it requires a plurality of memory chips not because of the memory capacity but because of the problem of addresses assigned to a program and data.

Figure 2:
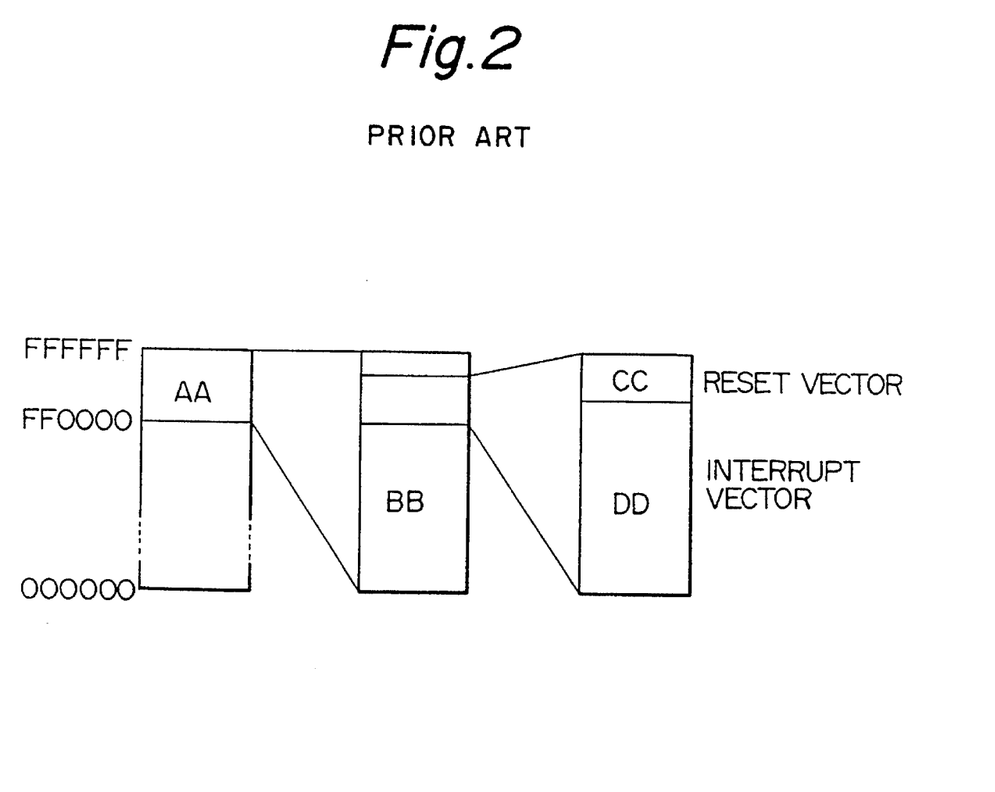
FIG. 2 is a diagram showing an example of a memory space of a semiconductor integrated circuit device (one-chip microcomputer) according to the prior art.

FIG. 2 shows an example of a memory space for a semiconductor integrated circuit device (one-chip microcomputer) according to the prior art.

As shown in FIG. 2, a ROM must be used for the reset vector CC in the memory space of the semiconductor integrated circuit device (one-chip microcomputer) in order to, for example, start an initial program after resetting. Moreover, because the interrupt vector DD is in the same region, it is unnecessary to change a region for observing the ROM by setting a user region (application program) to the region BB. However, for example, a dedicated one-chip microcomputer for performing predetermined control (concretely, for example, a one-chip microcomputer for controlling a printer) is used by installing high-capacity memory outside the microcomputer because it does not have any ROM. In this case, it is necessary that the address of the reset vector CC is observed in the ROM immediately after resetting and memory is present at the interrupt vector DD when the microcomputer starts normal operation after it is initialized.

For a user to reload the data in the interrupt vector DD, it is possible to constitute a system with the minimum number of chips by, for example, storing the initial program (reset vector CC) in the initial region 111a and assigning the above reloadable interrupt vector DD to the region 111b not in use other than the region for the initial program.

It is an object of the present invention to provide a semiconductor integrated circuit device for constituting a system with the minimum number of chips by selectively allowing one chip to be observed through a plurality of address spaces.

Below, the preferred embodiments of a semiconductor integrated circuit device according to the present invention will be explained, with reference to FIGS. 3 to 9.

Figure 3:
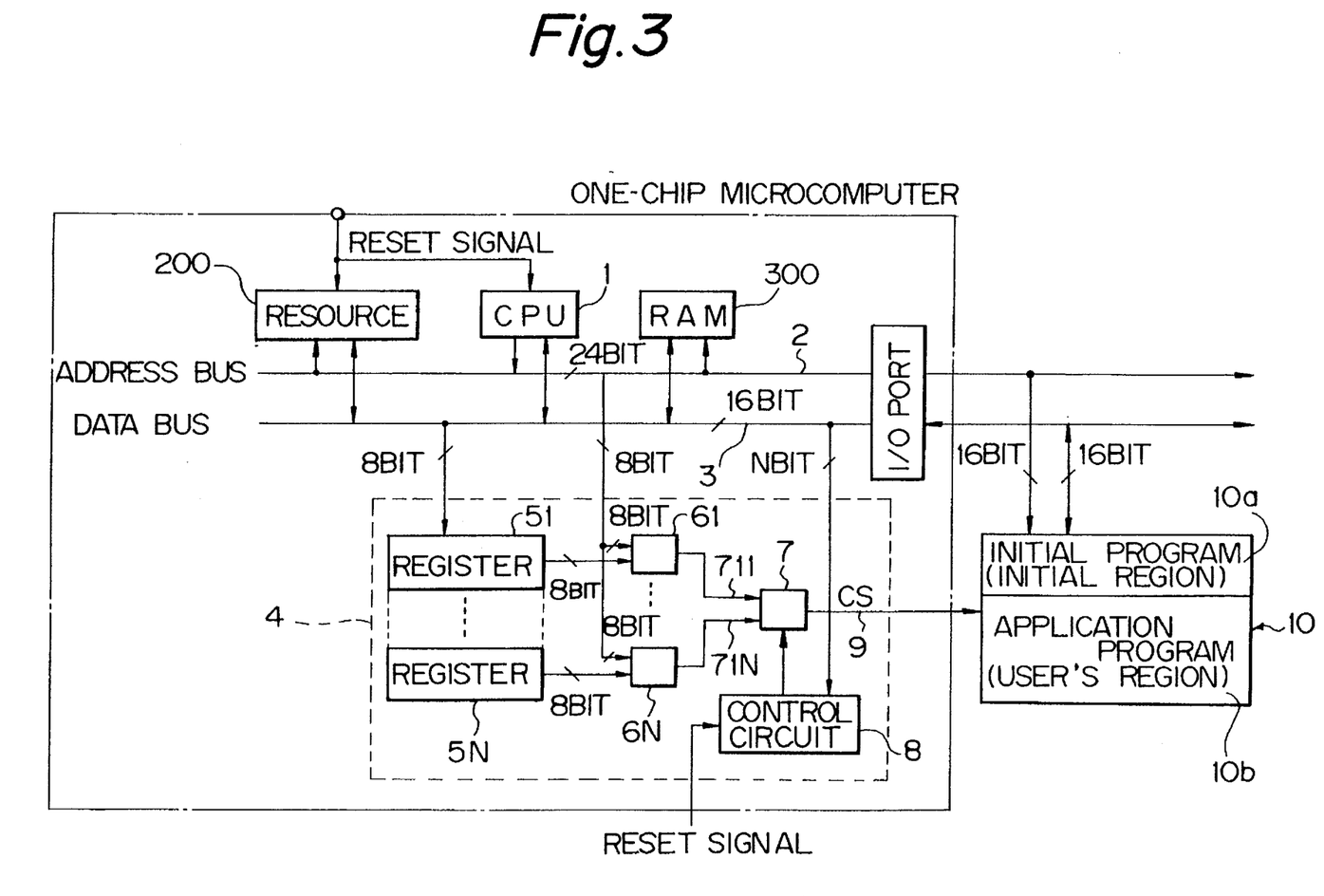
FIG. 3 is a block diagram showing an embodiment of a semiconductor integrated circuit device according to the present invention.
Figure 4:
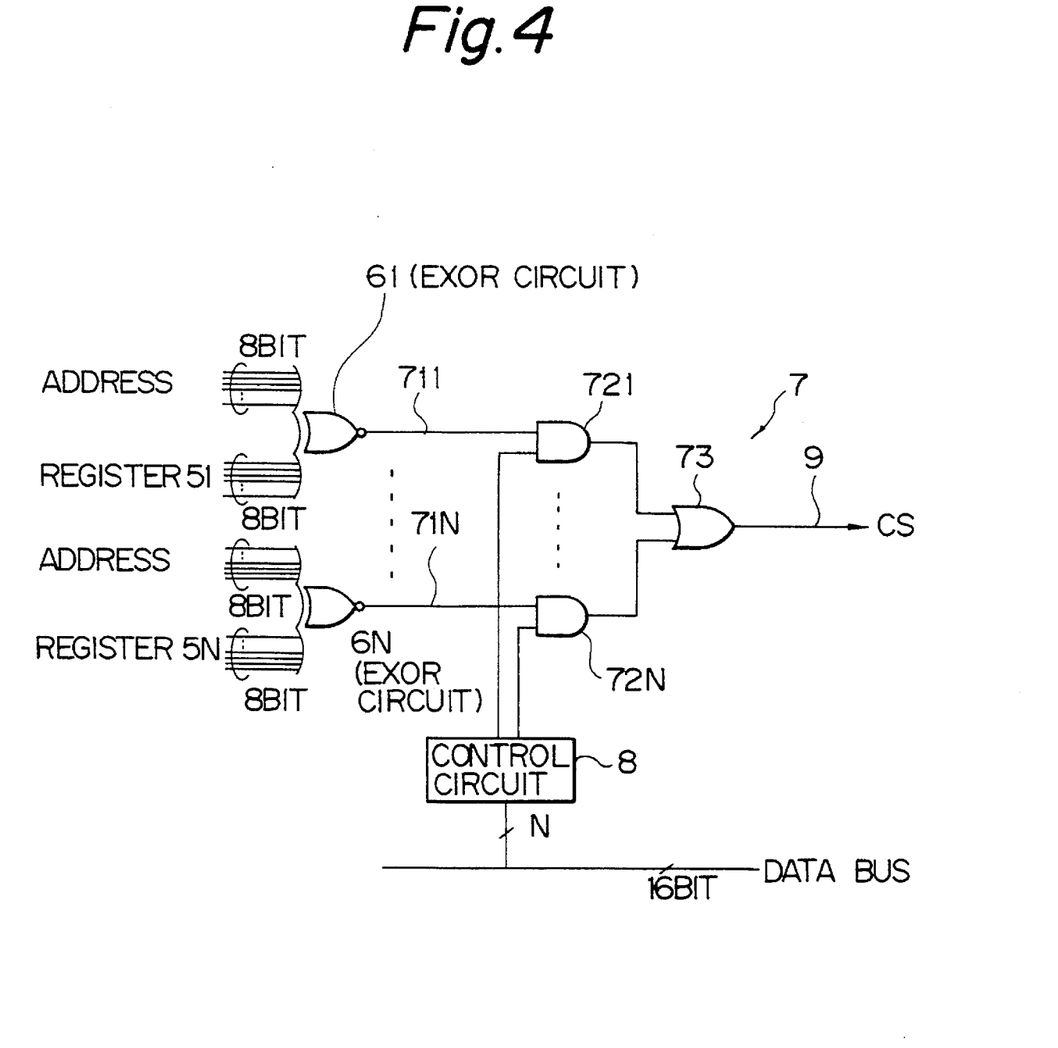
FIG. 4 is a diagram for explaining a selector circuit shown in FIG. 3.

FIG. 3 shows an embodiment of a semiconductor integrated circuit device according to the present invention. FIG. 4 shows a selector circuit of FIG. 3.

In FIG. 3, symbol 1 shows a CPU, 2 shows an address bus, 3 shows a data bus, 4 shows a semiconductor integrated circuit device (chip-select address recorder), 61 to 6N are comparator circuits for comparing addresses supplied from the CPU 1 with the addresses set to registers 51 to 5N, 7 shows a selector circuit controlled by a control circuit 8 and computing the logical sums of only valid outputs among those of the comparator circuits 61 to 6N, 9 shows a chip-select signal line, and 10 shows a memory chip. In this case, the control circuit 8 has N registers to hold the data outputted from the CPU. Symbol 200 shows a resource, 300 shows a RAM, and 400 shows an I/O port.

As shown in FIG. 3, the semiconductor integrated circuit device 4 of this embodiment is provided with the registers 51 to 5N for one memory chip 10 and the comparator circuits 61 to 6N corresponding to the registers 51 to 5N. And, each of the comparator circuits 61 to 6N compares the predetermined addresses (e.g. high-order 8 bits) among all addresses (e.g. 24 bits) supplied from the CPU 1 with the addresses (8 bits) previously set to each of the registers 51 to 5N and, when the both addresses coincide each other, it outputs a chip-select signal CS to the memory chip 10 through the selector circuit 7 controlled by the control circuit 8. In this case, for example, low-order 16 bits of the addresses of 24 bits are directly supplied to the memory chip 10. Moreover, data in the CPU 1 and memory 10 is exchanged through the data bus 3. Furthermore, the control circuit 8 has N registers so that only the output "1" is outputted.

FIG. 4 shows the selector circuit 7 of the semiconductor integrated circuit device shown in FIG. 3.

As shown in FIG. 4, the selector circuit 7 has AND gates 721 to 72N and OR gate 73. A control signal is supplied to one input of each of the AND gates 721 to 72N from the control circuit 8 and outputs (711 to 71N) of the corresponding comparator circuits 61 to 6N are supplied to the other input of each of the AND gates 721 to 72N. Outputs of the AND gates 721 to 72N are supplied to the OR gate 73 where a logical sum is computed and the chip-select signal CS is generated as the output of the OR gate 73. That is, the selector circuit 7 computes the logical sum of the signal outputted from each of the comparator circuits 61 to 6N to select the memory chip 10 when the address from the CPU 1 coincides with the address set to each of the registers 51 to 5N. In this case, the control circuit 8 judges whether a result outputted from each of the comparator circuits (61 to 6N) is valid or invalid according to the level of the control signal supplied to one input of each of the AND gates 721 to 72N.

The following is the description of the operation for changing the address assigned to each memory chip while a program is run in the semiconductor integrated circuit device shown in FIG. 3.

Firstly, when the device is started, the CPU reads the initial region 10a and data is written in a register according to its instruction. Only one data value comes to "1". Then, for example, the address set to the register 51 is made valid by the control circuit 8.

Secondly, a new address is set to, for example, the register 5N. Moreover, outputs of the comparator circuits 61 and 6N are made valid by operating the control circuit 8 and chips are made valid by two addresses set to the registers 51 and 5N. That is, for example, when high-order 8 bits of addresses supplied from the CPU 1 coincide with the addresses set to the registers 51 and 5N, the chip-select signal CS for selecting the memory chip 10 (that is, for making it active) is outputted.

Then, the program running address is branched to the region of the register 5N from the region of the register 51 and the output of the comparator circuit 61 is made invalid by operating the control circuit 8 so that the memory chip 10 cannot be accessed by the region indicated by the register 5N. Therefore, the semiconductor integrated circuit device of this embodiment makes it possible to use the region 10b other than the region for an initial program in the memory chip 10 for storing the initial program 10a as a user region. This also represents that one chip is enough if the memory chip 10 has a large enough capacity for the present invention though two or more memory chips are conventionally necessary when the initial program to be run immediately after resetting is separate from a user program.

Figure 5:
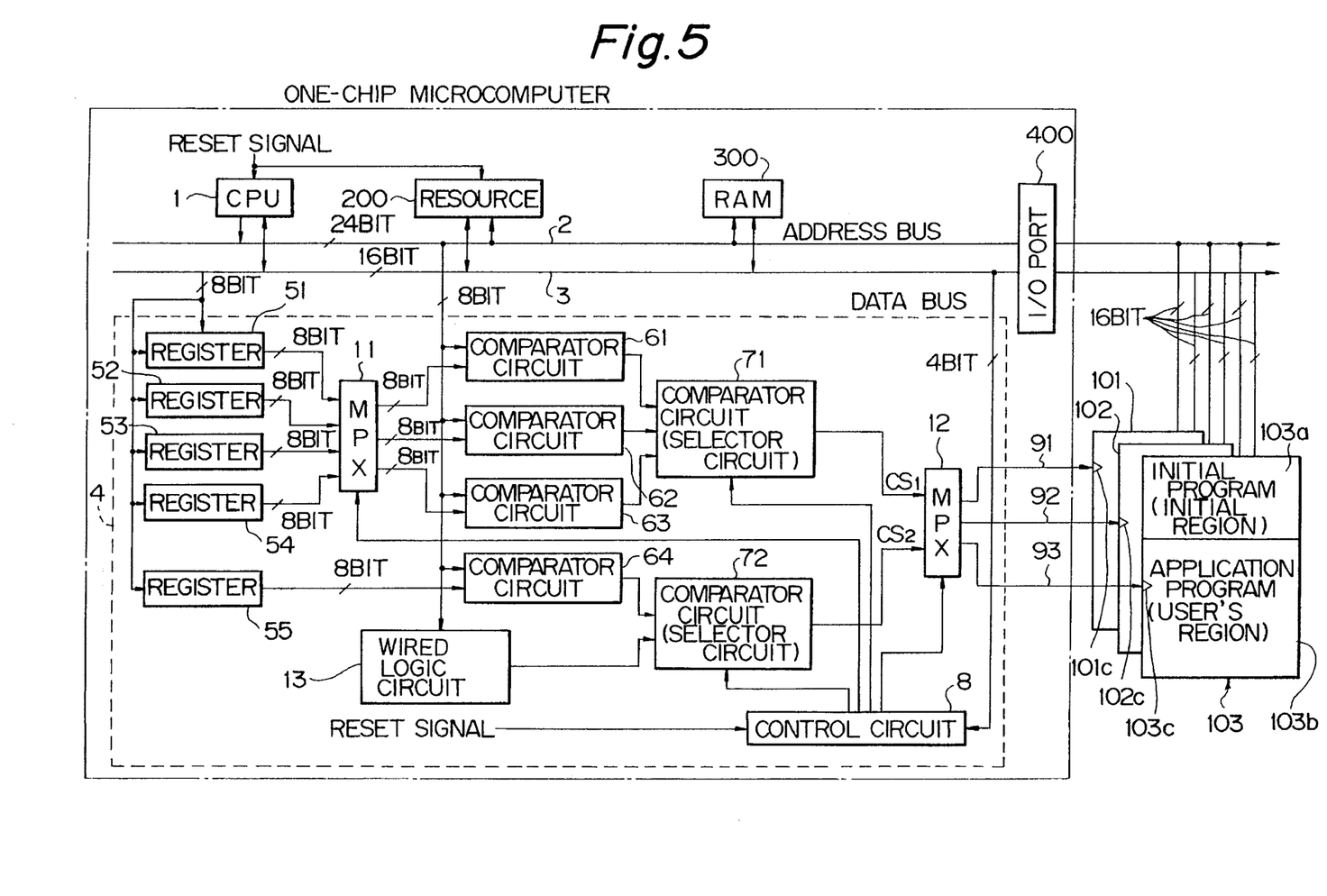
FIG. 5 is a block diagram showing another embodiment of a semiconductor integrated circuit device according to the present invention.

FIG. 5 shows another embodiment of a semiconductor integrated circuit device according to the present invention. In FIG. 5, an object same as that in FIG. 3 is provided with the same symbol.

As shown in FIG. 5, the semiconductor integrated circuit device 4 of this embodiment has five registers 51 to 55, four comparator circuits 61 to 64, a wired logic circuit 13, two selector circuits 71 and 72, a control circuit 8, and two multiplexers 11 and 12. Symbol 200 shows a resource, 300 shows a RAM, and 400 shows an I/O port.

Addresses outputted from the CPU 1 are supplied to the memory chips 101 to 103 through the address bus 2 and also supplied to each of the comparator circuits 61 to 64 of the address recorder 4. In this case, if addresses consist of 24 bits, the high-order 8 bits of the addresses are supplied to the comparator circuits 61 to 64 and low-order 16 bits of them are supplied to the memory chips 101 to 103. Data in the CPU 1 and the memory chips is exchanged through the data bus 3.

Among the addresses stored in the four registers 51 to 54, three addresses are selected by the multiplexer 11 and supplied to three comparator circuits 61 to 63 one each. In each of the comparator circuits 61 to 63, addresses (e.g. high-order 8 bits) outputted from the CPU 1 are compared with those in the registers 51 to 54 selected by the multiplexer 11. Moreover, addresses stored in the register 55 are directly compared with those (high-order 8 bits) outputted from the CPU 1. In this case, the addresses (high-order 8 bits) outputted from the CPU 1 are also supplied to the wired logic circuit 13. The wired logic circuit 13 is, for example, provided with the head address of the initial region 103a where the initial program (initial routine) in the memory chip 103 is stored according to the wired logic. Therefore, a predetermined initial program can be run when starting up a system by turning on the power or resetting the system. It is possible to variously modify the configuration of registers and comparator circuits according to necessity. Addresses of the registers 51 to 55 and the wired logic circuit 13 or those to be compared in the comparator circuits 61 to 64 are not restricted to high-order 8 bits.

It is possible to constitute, for example, the registers 51, 52, and 53 among four registers 51 to 54 connected to the multiplexer 11 by a random access memory (RAM) and the register 54 by a read only memory (ROM).

The comparator circuit (selector circuit) 71 is controlled by the control circuit 8 so as to compute the logical sum of only valid outputs among the outputs of the comparator circuits 61, 62, and 63. Similarly, the comparator circuit (selector circuit) 72 is controlled by the control circuit 8 so as to compute the logical sum of only valid outputs among the outputs of the comparator circuit 64 and wired logic circuit 13. The output (CS1) of the comparator circuit 71 and the output (CS2) of the comparator circuit 72 are assigned to the chip-select terminals 101c to 103c of three memory chips 101 to 103 through the multiplexer 12 and the chip-select signal lines 91 to 93. In this case, it is also possible to variously modify the configuration of selector circuits, multiplexer, and memory chips. It is unnecessary that the number of inputs of the multiplexer equals the number of outputs of it. However, when the number of outputs is larger than the number of inputs, idle terminals are held at the inactive level in the multiplexer.

The following is the description of operation examples of the semiconductor integrated circuit device in FIG. 5.

First, for resetting, a reset signal is inputted to a register of the control circuit 8 and thereby the register selects the wired logic circuit 13 side of the comparator circuit 72. That is, only the output of the wired logic circuit 13 is made valid by the control circuit 8 and the output of the comparator circuit 72 compared by the multiplexer 12 is supplied to the chip-select signal line 93. Under the above state, addresses outputted from the CPU are matched with only specific addresses set to the wired logic circuit 13. Therefore, the memory chip 103 selected (made active) by the chip-select signal line 93 can be accessed by the address set to the wired logic circuit 13. That is, the system can be started with an initial program necessary for the system immediately after resetting by storing the initial program in the region (initial region) 103a in which the address set to the wired logic circuit 13 is used as the head address.

Then, by setting the address of the region 103b where a user program should be stored (that is, the user region in the memory chip 103 where the initial region 103a is stored) to the register 55 by the initial program and making the output of the comparator circuit 64 valid by the control circuit 8, one memory the initial program region 103a and the user program region 103b in chip 103 can be accessed at the same time. Then, by operating the control circuit 8 to make the output of the wired logic circuit 13 invalid, the memory chip 103 can be accessed in only the region selected by the comparator circuit 64.

Figure 6:
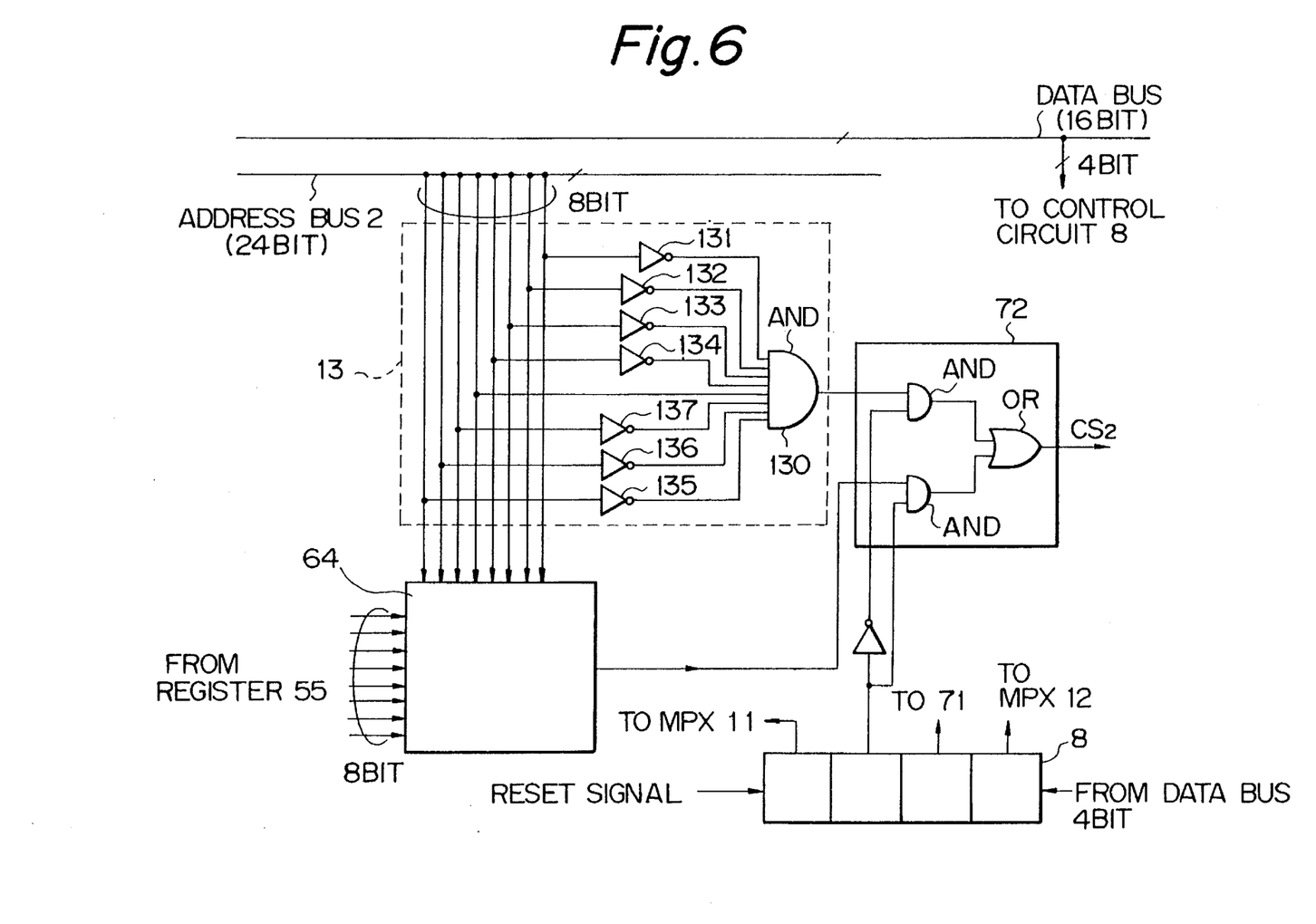
FIG. 6 is a diagram for explaining a wired logic circuit shown in FIG. 5.

FIG. 6 shows the wired logic circuit 13 of the semiconductor integrated circuit device shown in FIG. 5. As shown in FIG. 6, the wired logic circuit 13 comprises, for example, an AND gate 130 having a plurality of inputs and a plurality of inverters 131 to 137, and high-order 8 bits receive the addresses "00001000" from the CPU 1 at start after resetting to output "1". In this case, the comparator circuit 72 selects the wired logic circuit 13 and its output is supplied to the memory chip 103 as the chip-select signal CS2. However, if addresses are set to the registers 51 to 54 and the setting for connection of the multiplexer 11 is changed, high-speed switching can be made to access one memory chip (memory) in address spaces equal to or more than the number of comparator circuits and thereby it is possible to avoid overhead due to the resetting of addresses to registers.

Figure 7A:
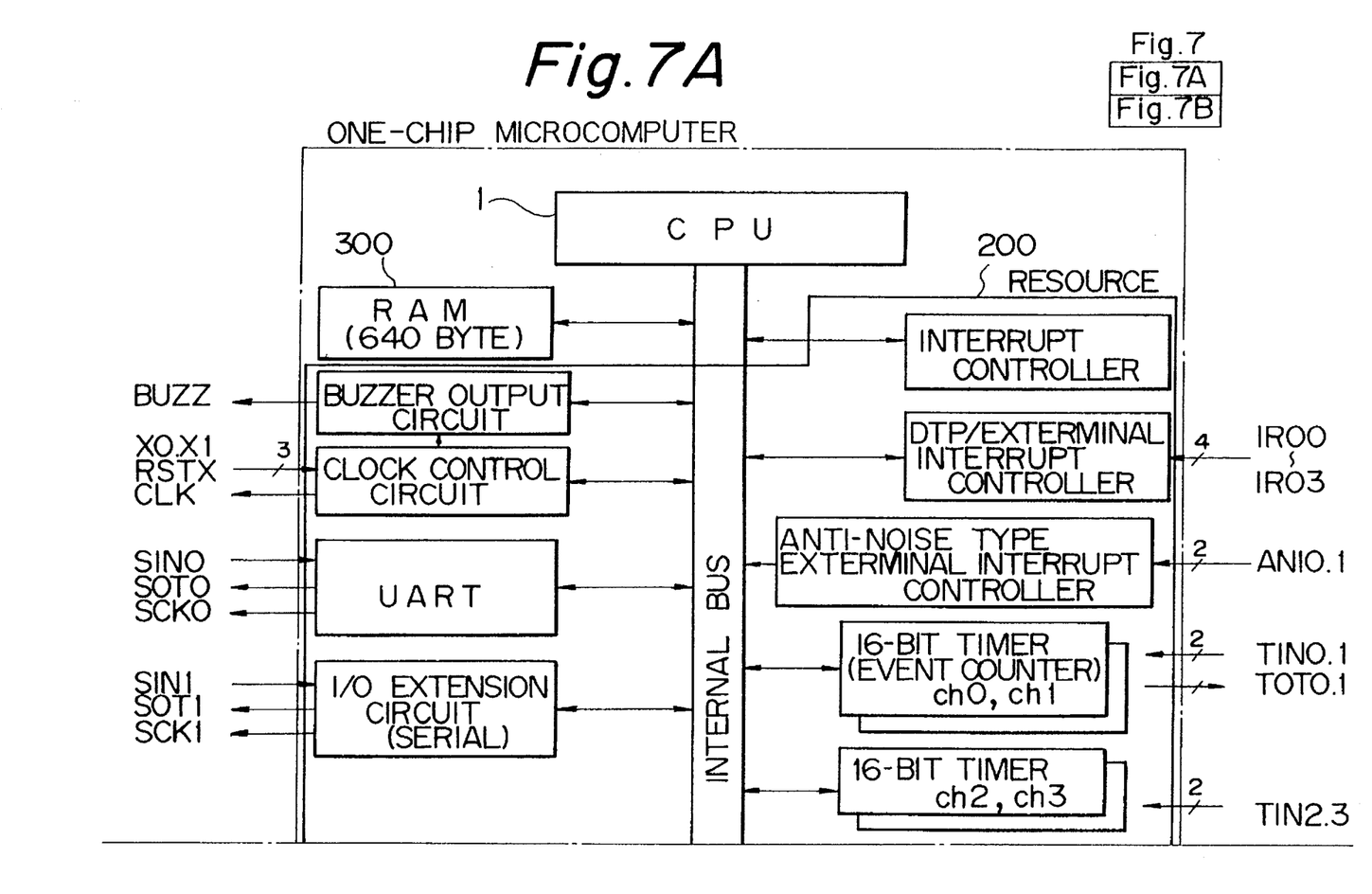
Figure 7B:
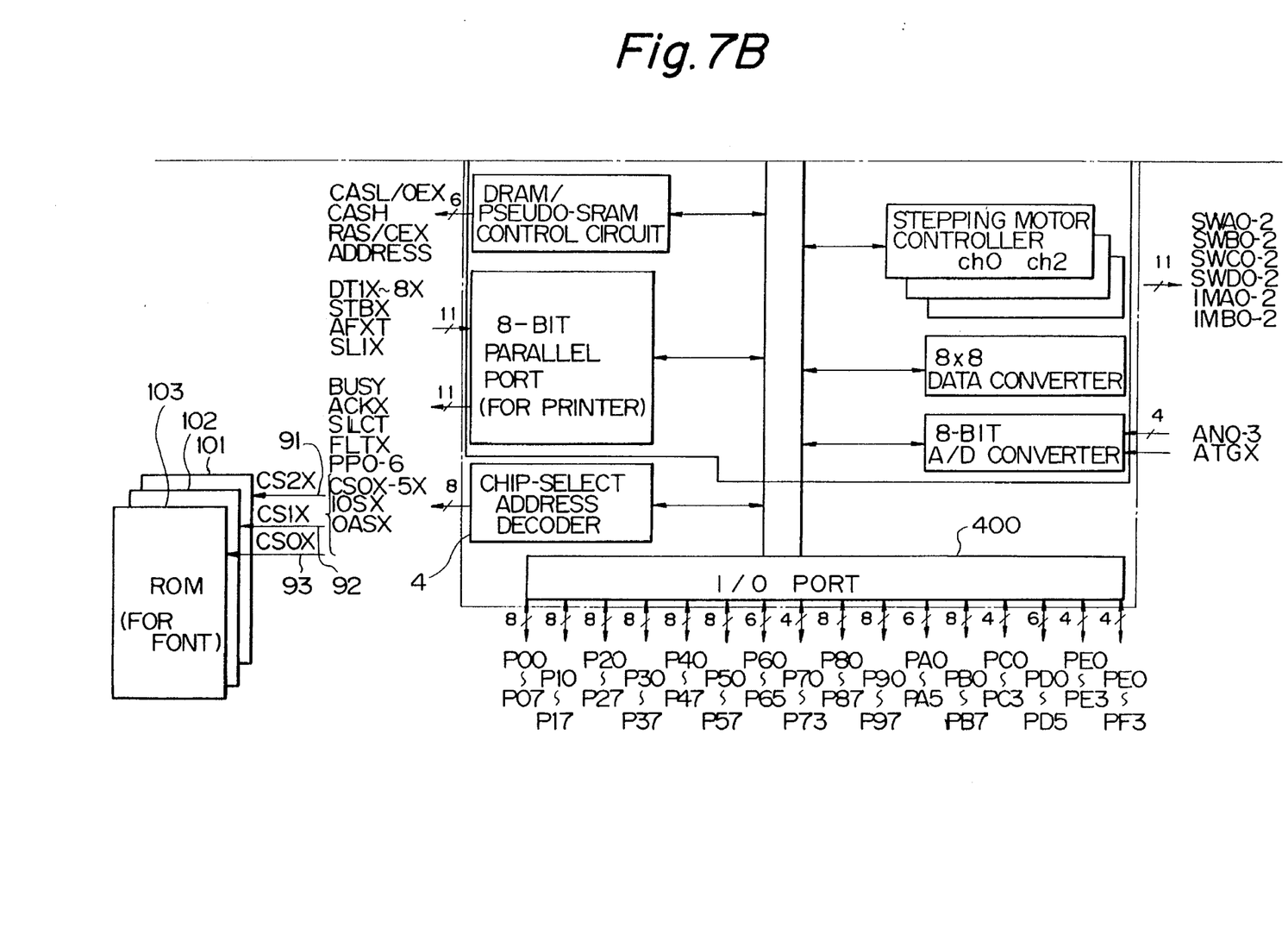
Figure 8A:
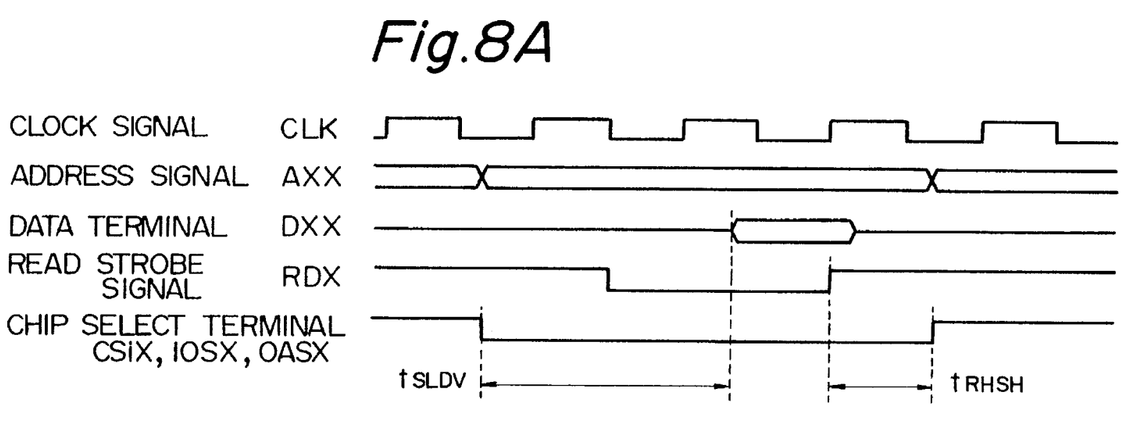
FIGS. 8A and 8B are timing charts for explaining read and write operations in the one-chip microcomputer shown in FIG. 7.
Figure 8B:
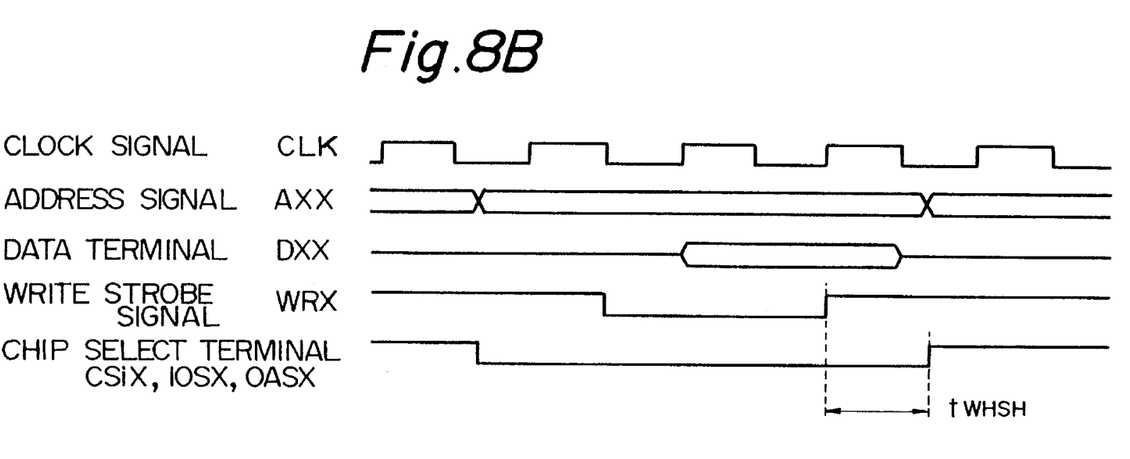

FIG. 7, which consists of FIGS. 7A and 7B, shows an example of overall configuration of a one-chip microcomputer having a semiconductor integrated circuit device according to the present invention, and FIGS. 8A and 8B are timing charts for explaining read and write operations in the one-chip microcomputer shown in FIG. 7.

Figure 9:
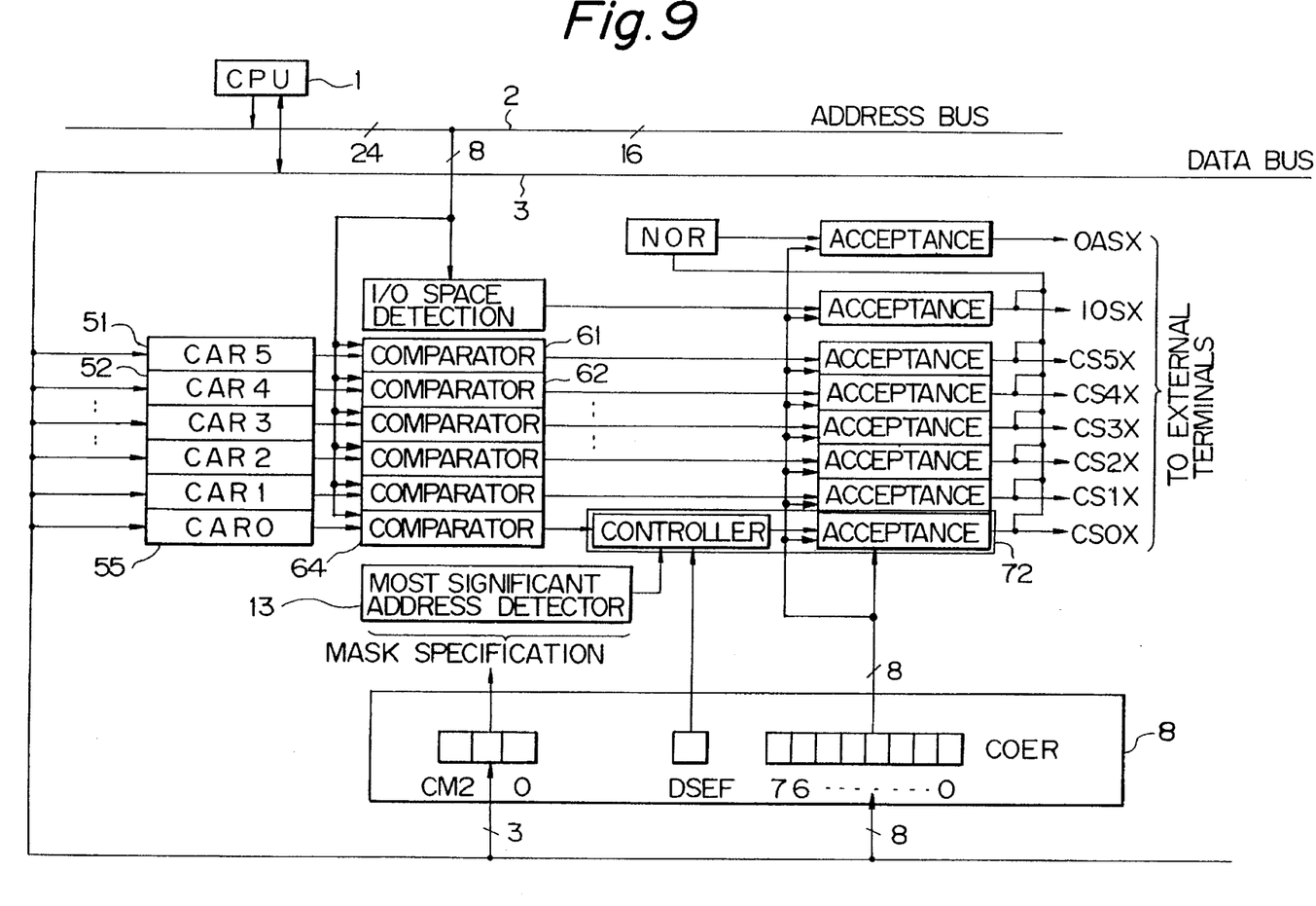
FIG. 9 is a block diagram showing a chip-select address recorder shown in FIG. 7.

The one-chip microcomputer in FIG. 7 (FIGS. 7A and 7B) is a one-chip microcomputer for exclusively controlling a printer, which controls a plurality of extend ROMs storing each font for the alphabet. That is, the one-chip microcomputer shown in FIG. 7 comprises a CPU 1, resource 200, RAM 300, chip-select address recorder (semiconductor integrated circuit device) 4, and I/O port 400. The resource 200 comprises an interrupt control circuit, timer, and clock control circuit. Read operation of the chip-select address recorder 4 in the one-chip microcomputer is shown in FIG. 8A and write operation of it is shown in FIG. 8B. FIG. 9 shows the chip-select address recorder 4 of FIG. 7, and FIG. 10 shows a memory map of a semiconductor integrated circuit device according to the present invention.

Figure 10:
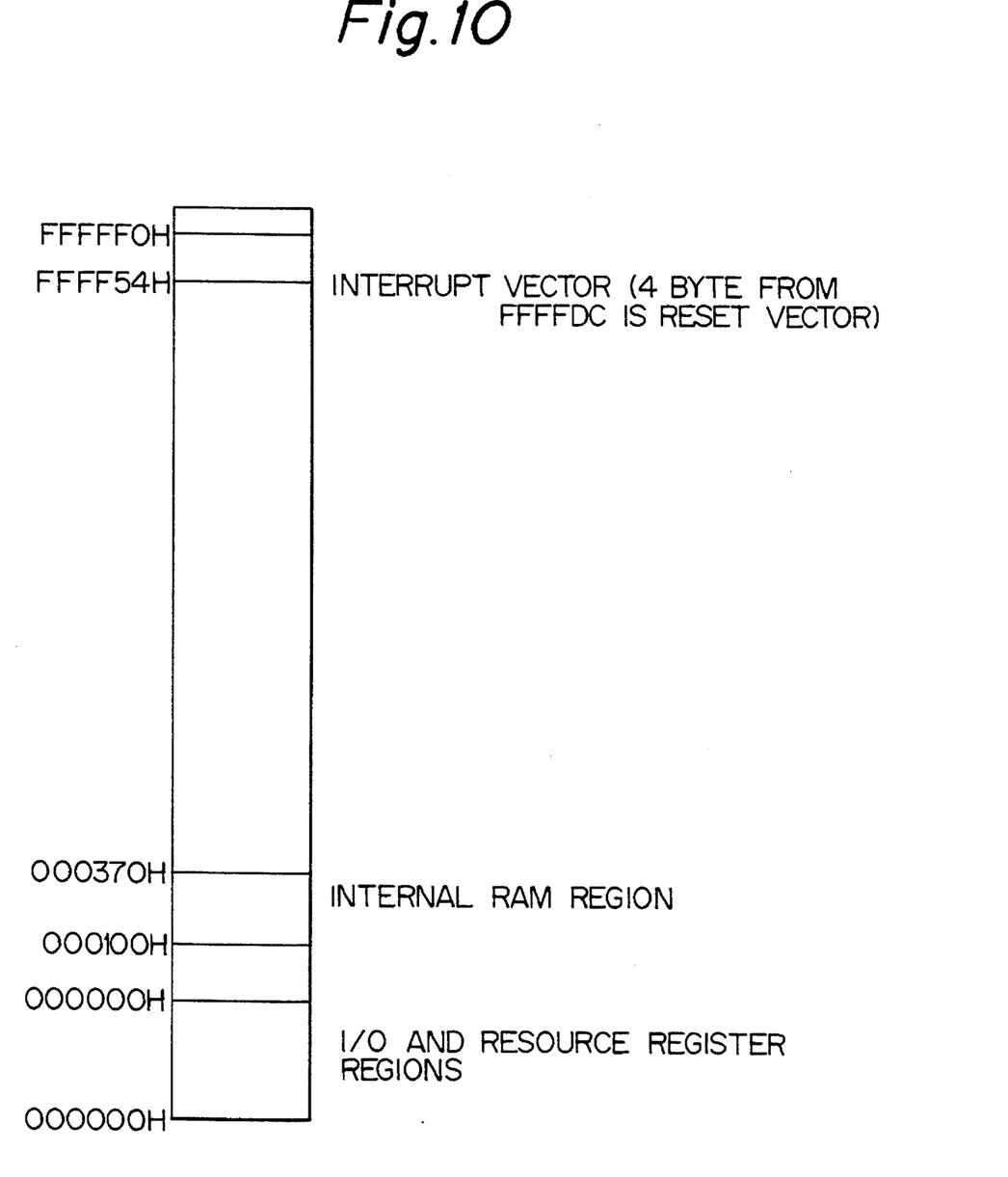
FIG. 10 is a diagram showing an example of a memory map of a semiconductor integrated circuit device according to the present invention.

As shown in FIGS. 9 and 10, DSFF bit is initialized to "0" immediately after resetting and CSOX is made active by a most-significant address detection circuit (corresponding to the wired logic circuit 13 in FIG. 5) when high-order 8 lines of the address bus 2 are FFH. CAR0 (corresponding to the register 55 in FIG. 5) is initialized to FFH. In this case, CAR1 to CAR5 are indeterminate, COER is set to "1" for only the bit corresponding to CSOX, and outputs of CSX1 to CSX5 and IOSX and OASX are disallowed. Then, addresses are set to CAR0 register by the initial program in the region (FF0000H to FFFFFFH) where the output of CSOX is allowed. Thereby, CSOX detects the most significant address and becomes active in two regions newly set into CAR0. In the above descriptions, or in FIG. 9, reference CARi denotes a comparing address register, COER denotes a chip select output enable register.

Moreover, CS0X is branched (jumps) to an address set into CAR0 and does not detect the most significant address. As a result, memory connected to CSOX can be accessed by only the address set to CAR0. Note, each bit (bit 0 to bit 7) of COER is applied to the corresponding one of the acceptances to control the operation thereof.

Figure 11:
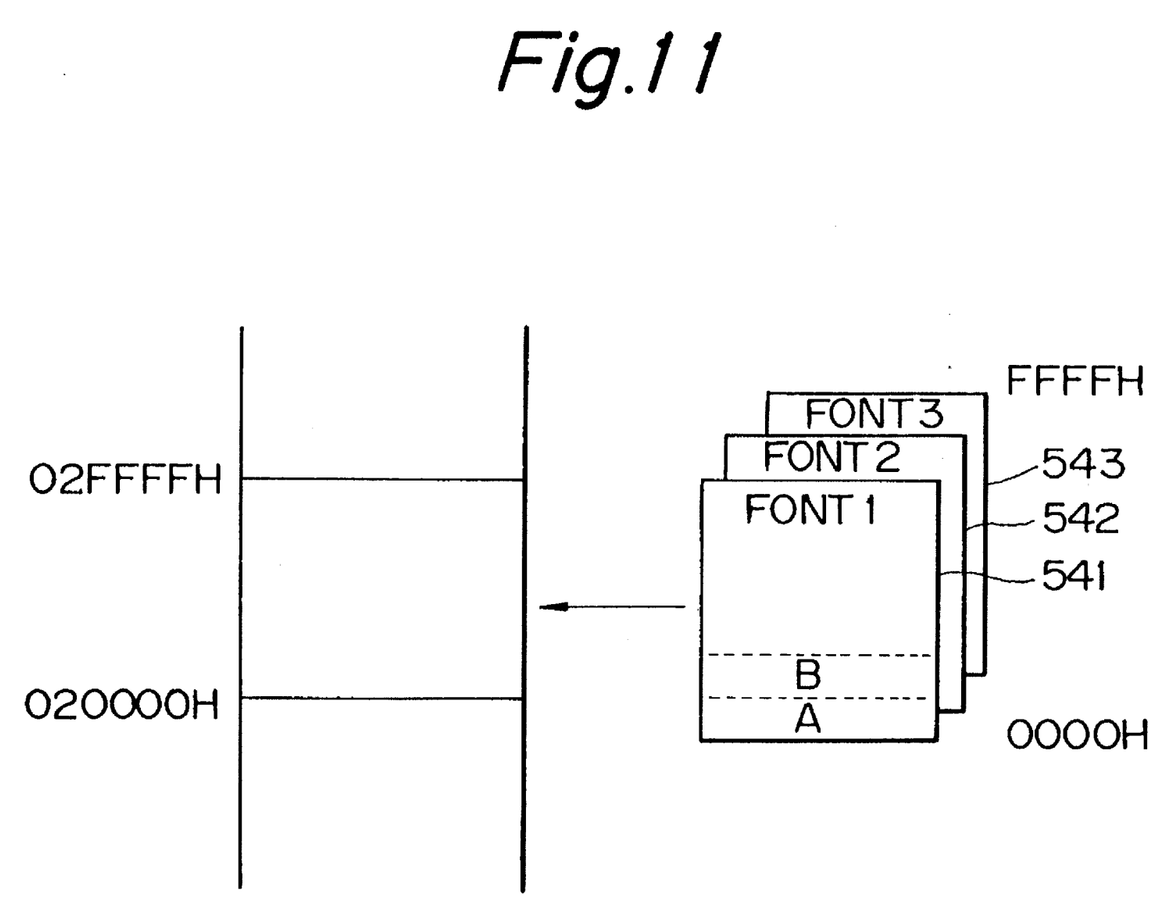
FIG. 11 is a diagram for explaining the case when applying the semiconductor integrated circuit device of the present invention to a printer control.
Figure 12:
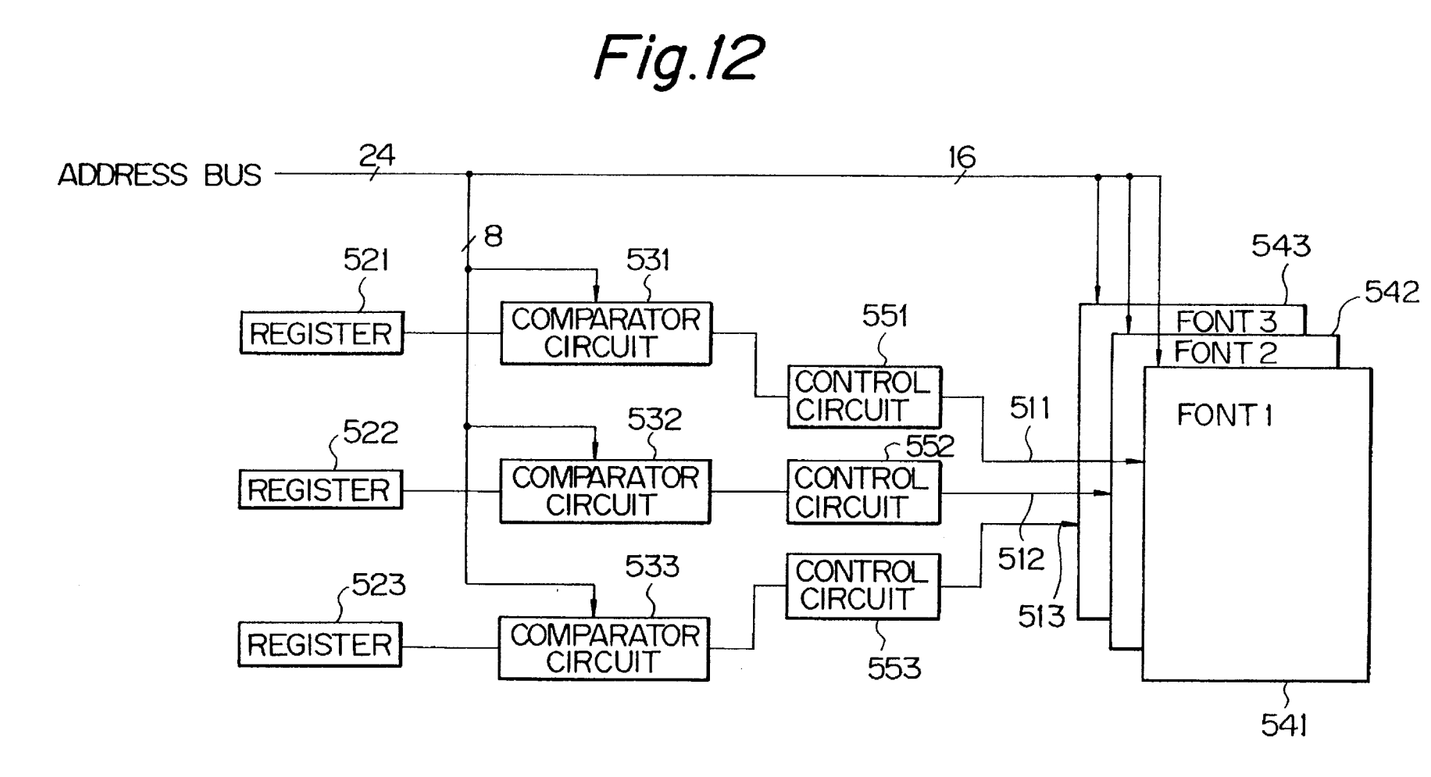
FIG. 12 is a block diagram showing main portions of the semiconductor integrated circuit device shown in FIG. 11.

FIG. 11 shows the case when applying the semiconductor integrated circuit device of the present invention to a printer controller, and FIG. 12 shows the main portions of the semiconductor integrated circuit device shown n FIG. 11. As described by referring to FIGS. 7 and 9, the chip-select address recorder 4 controls a plurality of memory chips (ROM) 101 to 103 storing each font. Concretely, as shown in FIGS. 11 and 12, the memory chips 541 to 543 (101 to 103) are constituted as a ROM with the capacity of 64 KB respectively and alphabet character patterns of "A", "B", and "C" are stored in the same address in each of the ROMs 541 to 543 in the direction from low- to high-order addresses. Therefore, the patterns are stored in each of the ROMs 541 to 543 so that the head address of "A" is "0000H" and that of "B" is "0020H". The address spaces of the CPU to which these ROMs are assigned range, for example, from "020000H" to "02FFFFH".

The value "02H" is set to the register 521 as an initial value to make only the chip-select signal 511 active and other signals (signal lines) inactive by the control circuits 551, 552, and 553. When font data is read from "02000H" to print the character "A", data in the ROM 541 where the font 1 is stored is read. When "02H" is set to the register 522 to make the chip-select signal 512 active and the signal 511 inactive, it is possible to read the data in the ROM 542 where the font 2 is stored by accessing the same "020000H". Thus, it is possible to read types of fonts and assigned addresses independently by controlling the set values of the registers 521, 522, and 523, and the control circuits 551, 552, and 553.

As described above in detail, the semiconductor integrated circuit of the present invention makes it possible to selectively observe one chip through a plurality of address spaces and constitute a system with the minimum number of chips. Therefore, it is possible to decrease the power consumption and the size of the entire system.

Moreover, because the present invention makes it possible to dynamically reload the interrupt vector (symbol DD in FIG. 2), it is possible to change processing routines in slow or normal speed receiving commands and character codes (normal operation), and in continuously receiving several hundreds of bit images (continuous operation). Further, it is also possible to change interrupt processing routines for a stepping motor in feeding paper for one line and for one page in order to receive data from a printer parallel port (generally called a centronics interface) of a printer.

Many different embodiments of the present invention may be constructed without departing from the spirit and scope of the present invention, and it should be understood that the present invention is not limited to the specific embodiments described in this specification, except as defined in the appended claims.

I claim:

1. A semiconductor integrated circuit device comprising:
   first means for generating an address and supplying the address to an external device;
   a plurality of registers for storing predetermined data which designate an address space;
   a plurality of comparators for comparing the address output from said first means and the predetermined data stored in each of said registers; and
   second means for merging a plurality of outputs of said comparators and for generating an enable signal to activate said external device, when at least one of the outputs of said comparators indicates coincidence between the address and the predetermined data,
   wherein said external device includes at least one memory chip having both an initial region of address spaces and an application program region of address spaces, and
   wherein said semiconductor integrated circuit device is adapted for supplying the address to both said initial region and said application program region in said memory chip.

2. A semiconductor integrated circuit device according to claim 1, wherein said second means selectively merges the outputs of said comparators in accordance with a first control data.

3. A semiconductor integrated circuit device according to claim 2, wherein said second means selectively merges some of the outputs of said comparators in accordance with the first control data.

4. A semiconductor integrated circuit device according to claim 2, wherein said second means selects one of the outputs of said comparators in accordance with the first control data.

5. A semiconductor integrated circuit device according to claim 2, wherein said semiconductor integrated circuit device further comprises a central processing unit, an address bus for transferring the address, and a data bus; and the predetermined data and the first control data are supplied by said central processing unit through said data bus.

6. A semiconductor integrated circuit device according to claim 5, wherein the predetermined data and the first control data are changed by said central processing unit.

7. A semiconductor integrated circuit device according to claim 1, wherein said semiconductor integrated circuit device further comprises a multiplexer, connected between at least one of said comparators and said registers, for selectively supplying the predetermined data output from one of said registers in accordance with a second control data.

8. A semiconductor integrated circuit device according to claim 1, wherein said semiconductor integrated circuit device further comprises a plurality of first terminals for outputting the outputs of said comparators respectively, and a second terminal, for outputting the enable signal.

9. A semiconductor integrated circuit device according to claim 8, wherein said second means selectively enables to output the outputs of said comparators to said first terminals in accordance with a first control data.

10. A semiconductor integrated circuit device according to claim 1, wherein said external device comprises a plurality-of memory chips.

11. A semiconductor integrated circuit device according to claim 10, wherein said semiconductor integrated circuit device is used for a printer, and said memory chips store character data of different fonts.

12. A semiconductor integrated circuit device according to claim 1, wherein said semiconductor integrated circuit device further comprises at least one fixed data setting means, operatively connected in parallel with said registers, for previously setting a fixed data which designate a specific address space.

\* \* \* \* \*